(12) United States Patent
Hafendorfer

(10) Patent No.: US 7,240,891 B2
(45) Date of Patent: Jul. 10, 2007

(54) BLOWER SUPPORT DEVICE FOR UTILITY VEHICLE

(76) Inventor: James T. Hafendorfer, 12202 Old Shelbyville Rd., Louisville, KY (US) 40243

( * ) Notice: Subject to any disclaimer, the term of this patent is extended or adjusted under 35 U.S.C. 154(b) by 914 days.

(21) Appl. No.: 10/622,899

(22) Filed: Jul. 19, 2003

(65) Prior Publication Data

US 2005/0205750 A1    Sep. 22, 2005

(51) Int. Cl.
*F16M 1/00* (2006.01)
(52) U.S. Cl. ............. 248/676; 224/410; 224/564; 248/125.7; 248/425; 248/637; 248/688
(58) Field of Classification Search ........... 248/637, 248/640, 676, 125.7, 122.1, 126, 131, 145, 248/425, 176.3, 224.8, 688; 224/401, 410, 224/564, 565, 566; 280/35, 760

See application file for complete search history.

(56) References Cited

U.S. PATENT DOCUMENTS

| 3,796,170 | A | * | 3/1974 | Viera .................. 108/139 |
| 5,179,590 | A | * | 1/1993 | Wang .................. 379/454 |
| 5,553,820 | A | * | 9/1996 | Karten et al. ............ 248/286.1 |
| 5,769,369 | A | * | 6/1998 | Meinel ................ 248/176.1 |
| 5,975,472 | A | * | 11/1999 | Hung .................. 248/278.1 |
| 6,213,438 | B1 | * | 4/2001 | Ostby et al. ............ 248/276.1 |

* cited by examiner

*Primary Examiner*—Carl D. Friedman
*Assistant Examiner*—Bradley H Duckworth
(74) *Attorney, Agent, or Firm*—Stoll Keenon Ogden PLLC; David J. Clement

(57) ABSTRACT

A blower support device for use on a utility vehicle includes a generally horizontally oriented platform and a vertically oriented support member. A mounting channel is provided and extends laterally away from the vertical support member for pivotably mounting the support stand to the mounting post for pivoting movement of the support stand between an access position and an operational position. A remote throttle control is also provided.

17 Claims, 5 Drawing Sheets

BLOWER SUPPORT DEVICE FOR UTILITY VEHICLE

CROSS-REFERENCE TO RELATED APPLICATION

This application claims the benefit of U.S. Provisional Application No. 60/369,978, filed Jul. 18, 2002, and U.S. Provisional Application No. 60/396,979, filed Jul. 18, 2002.

BACKGROUND OF THE INVENTION

The present invention relates broadly to yard maintenance devices and, more particularly, to a leaf blower support device that will provide support for a leaf blower, or other power implement, when used on a lawn vehicle, land vehicle, or other utility vehicle.

Lawn grooming and maintenance typically requires leaf blowing and other blowing chores including blowing lawn trimmings out of certain areas. Currently, leaf blowers or lawn blowers, herein referred to generically as blowers, are worn by a user in the manner of a back pack with straps that extend across the shoulders of the user with the blower, fuel container, and drive motor being carried by the user.

Trends in the industry point to mobilization of the operators of weed eaters and blowers and with the mobilization comes the opportunity to remove the load from the back of a blower operator. Improvements to lawn grooming operations are immediate after mobilization of the formerly foot-bound workers. Walking, carrying and operating implements can slow down a lawn grooming operation, especially when the facility undergoing care is large. Further, walking and carrying the implement can tire workers, requiring frequent breaks. Use of the present invention can immediately relieve these problems.

Even with mobilization, only a portion of those benefits may be realized if the blower operator is required to carry the blower on his or her back. Accordingly, there exists the need for a device to support a blower while the operator is mobile.

SUMMARY OF THE INVENTION

It is accordingly the object of the present invention to provide a blower support device for use with a lawn traveling vehicle that will relieve the burden of the operator when the operator is riding on mobile lawn care vehicle. It will be apparent to those skilled in the art that the present invention is capable of a wide variety of uses and that the present description, with a focus on yard maintenance, should not be seen as limiting the present invention in any way.

It is additionally an object of the present invention to provide a leaf blower, or other power implement support device for use on utility vehicles, including lawn vehicles.

It is another object of the present invention to provide such a leaf blower support device that allows the blower to be moved between a use position and a position for starting the blower that is convenient for the operator of the lawn vehicle.

Another object of the present invention is to provide such a blower support device that is latchable in the use position.

To those ends a power implement support device for vehicular mounting includes an implement support assembly including an implement support member and a pivotal support member mounted thereto. The power implement support device further includes a base support member for mounting to the vehicle adjacent an operator seat thereof, the base support member having the pivotal support member pivotably mounted thereto for movement of the implement support member between an implement use position and an implement access position. The present power implement support device further includes a latching assembly having a first portion mounted to the implement support assembly and a second portion for mounting to the vehicle to selectively retain the implement support member in the use position.

It is preferred that the implement support assembly include a generally planar platform for implement support. Further, the implement support assembly may preferably include a generally vertical support member projecting outwardly from the one of the implement support member and the pivotal support member.

In addition, the present invention may preferably further include at least one generally horizontally-oriented support member mounted to the generally vertically-oriented support member at a position vertically spaced from the implement support member.

It is further preferred that the present invention include a throttle control mechanism for the power implement, with the throttle control mechanism being mounted to one of the implement support member and the pivotal support member.

Preferably, the first portion of the latching assembly includes a curved member pivotally mounted to one of the implement support member and the pivotal support member; and the second portion of the latching assembly includes a stop bar for selective engagement and disengagement by the curved member. It is further preferred that the curved member is mounted to one of the implement support member and the pivotal support member for pivotal movement of the curved member in a generally vertical manner.

It is preferred that the first portion of the latching assembly include a lifting member mounted to the curved member to assist the pivotal movement of the curved member. It is also preferred that the stop bar includes a ramped surface for engagement by the lifting member to assist the curved member to override the stop bar during latching.

The present invention may be described in a more concise, detailed manner. In that regard, a power implement support device for vehicular mounting includes an implement support assembly including an implement support platform, a pivotal support member mounted thereto, a generally vertical support member projecting outwardly from the one of the implement support platform and the pivotal support member, and at least one generally horizontally-oriented support member mounted to the generally vertically-oriented support member at a position vertically spaced from the implement support platform. The support device according to the present invention includes a base support member for mounting to a vehicle adjacent an operator seat thereof, the base support member having the pivotal support member pivotably mounted thereto for movement of the implement support member between an implement use position and an implement access position. Also included is a latching assembly having a first portion mounted to the implement support assembly and a second portion for mounting to the vehicle to selectively retain the implement support member in the use position, the first portion including a curved member pivotally mounted to one of the implement support member and the pivotal support member; and with the second portion including a stop bar for selective engagement and disengagement by the curved member, and wherein the curved member is mounted to one of the implement support member and the pivotal support member for pivotal movement of the curved member in a generally vertical manner.

The present support device further may preferably include a throttle control mechanism for the power implement, the throttle control mechanism being mounted to one of the implement support member and the pivotal support member.

It is preferred that the first portion of the latching assembly includes a lifting member mounted to the curved member to assist the pivotal movement of the curved member. Preferably, the stop bar includes a ramped surface for engagement by the lifting member to assist the curved member to override the stop bar during latching.

The present invention may also be described in more specific terms with respect to one of its environments. To that end, a leaf blower support device for mounting to a lawn vehicle, the leaf blower support device includes a blower support assembly including a blower support platform, a pivotal support member mounted thereto, a generally vertical support member projecting outwardly from the one of the blower support platform and the pivotal support member, and at least one generally horizontally-oriented support member mounted to the generally vertically-oriented support member at a position vertically spaced from the implement support platform for engagement by any straps associated with the blower. The present invention also includes a base support member for mounting to the lawn vehicle adjacent an operator seat thereof the base support member having the pivotal support member pivotably mounted thereto for movement of the blower support member between a blower use position and a blower starting position. Also included is a latching assembly having a first portion mounted to the blower support assembly and a second portion for mounting to the lawn vehicle to selectively retain the blower support platform in the blower use position, wherein the first portion includes a curved member pivotally mounted to one of the implement support member and the pivotal support member and wherein the second portion includes a stop bar for selective engagement and disengagement by the curved member, and wherein the curved member is mounted to one of the blower support platform and the pivotal support member for pivotal movement of the curved member in a generally vertical manner for latching engagement with and disengagement from the stop bar.

It is preferred that the present invention further include a throttle control mechanism for the blower, with the throttle control mechanism being mounted to one of the blower support platform and the pivotal support member.

It is preferred that the first portion of the latching assembly includes a lifting member mounted to the curved member to assist the pivotal movement of the curved member. It is further preferred that the stop member includes a ramped surface for engagement by the lifting member to assist the curved member to override the stop member during latching.

By the above, the present invention provides a convenient and sturdy support for a leaf blower for use on or with a lawn mower, tractor, or other utility vehicle.

The present invention provides a support stand, including a generally horizontal platform and a generally vertically extending support member. A cylindrical mounting post, or shank is provided and projects upwardly for operational receipt in a corresponding cylindrical mounting receiver. The platform and vertically extending support member may then be rotated about an axis defined by the mounting post in registry with the receiver. Additionally, a remote throttle is provided for access by a user.

DESCRIPTION OF THE PREFERRED EMBODIMENT

Figure 1:
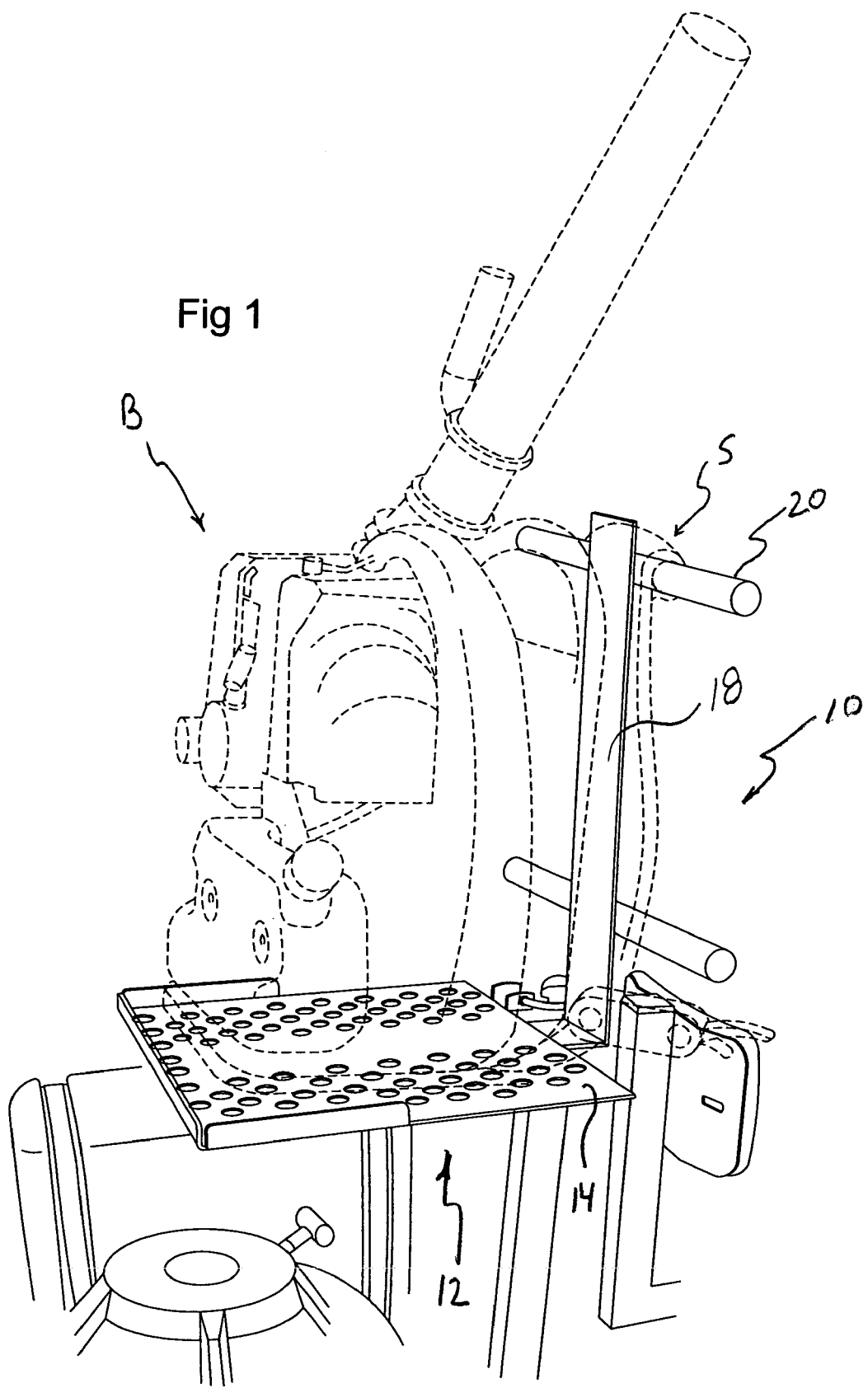
FIG. 1 is a perspective view of a blower support device according to a preferred embodiment of the present invention supporting a conventional blower.

Turning now to the drawings and, more particularly to FIG. 1, a power implement support device is illustrated generally at 10 and is seen in an operational condition mounted to a lawn utility vehicle V with a leaf blower B attached thereto. It is preferred that the power implement support device 10 be mounted directly behind an operator, adjacent the operator's seat so that while the burden of carrying the blower is alleviated, the blower remains in a familiar position to the user. This is better illustrated in FIG. 2 wherein a lawn vehicle V includes a seat T with an implement support device 10 according to the present invention depicted immediately rearwardly of the seat T.

As seen in FIG. 1, an implement or blower support assembly is illustrated generally at 12 and includes a generally horizontally extending support member formed as a platform 14 that is sized to hold a conventional blower B and has attached thereto a vertically extending support member 18. The vertically extending support member 18 has two horizontally projecting, spaced support members formed as rods 20 mounted thereto in a vertically spaced relationship. The rods 20 serve the operator by providing a mounting location for the conventional backpack-like straps S usually provided with a blower B. This eliminates the need to modify a blower for mounting to the implement support device 10.

It should be noted that the preferred configuration includes a substantially horizontally-extending platform 14 and some form of vertical support member 18, however, it will be understood by those skilled in the art that several configurations of the basic implement support device 10 are possible. For example, a generally planar vertical support member may be provided with openings therein to receive the blower straps. Ultimately, straps could be attached to the vertically extending support member for engagement with the blower. These and other variations will be apparent to those skilled in the art.

Figure 2:
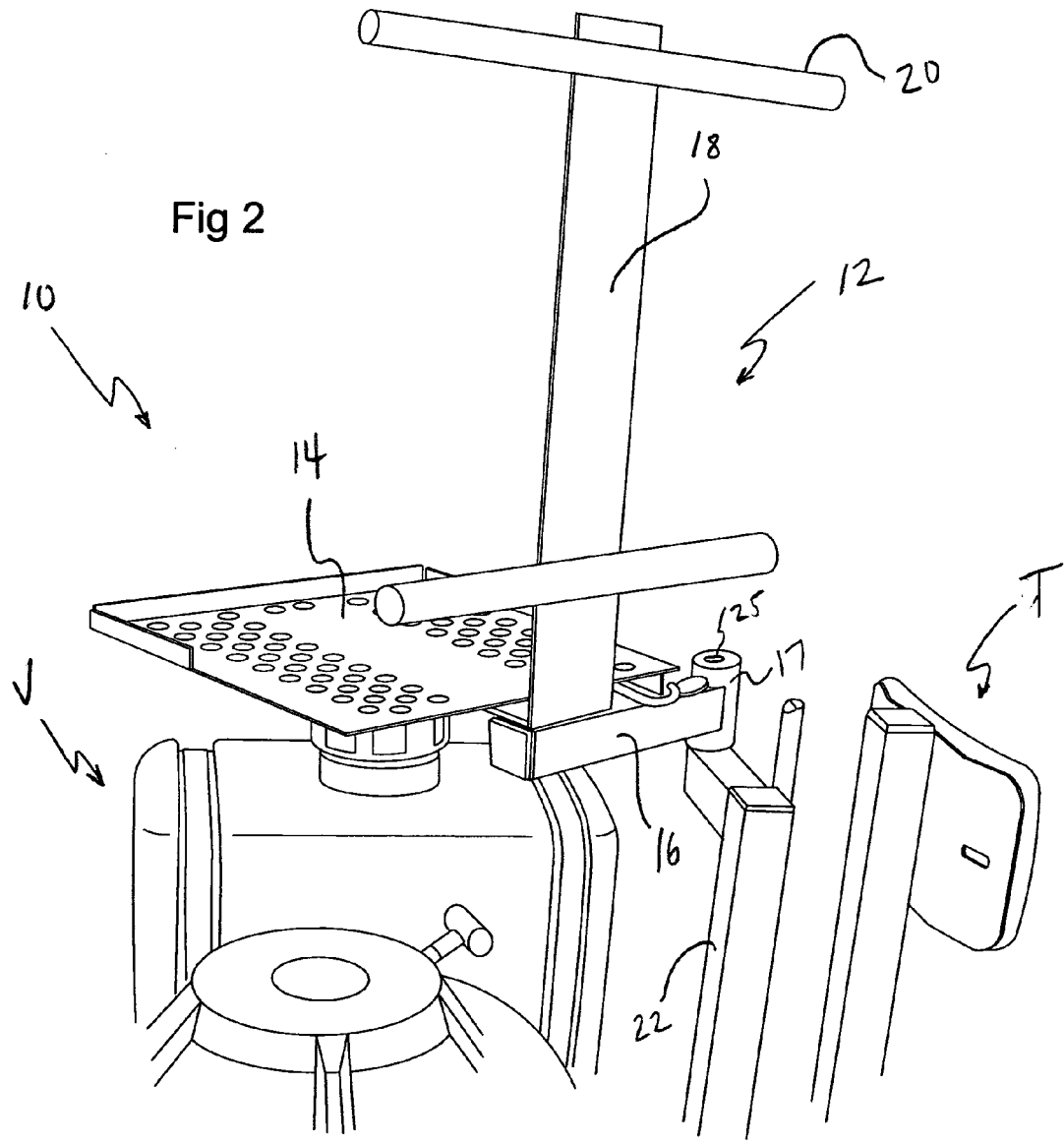
FIG. 2 is a perspective view of a the blower support device illustrated in FIG. 1 shown in an intermediate position.

As seen in FIG. 2, a generally horizontally extending pivotal support member 16 is provided that extends laterally away from the vertically oriented support member 18, although it could be mounted to the platform 16. The pivotal support member 16 provides the primary support for the implement support device 10 when carried on a land vehicle. A generally tubular receiver 17 is provided at the distal end of the support member 16.

Figure 3:
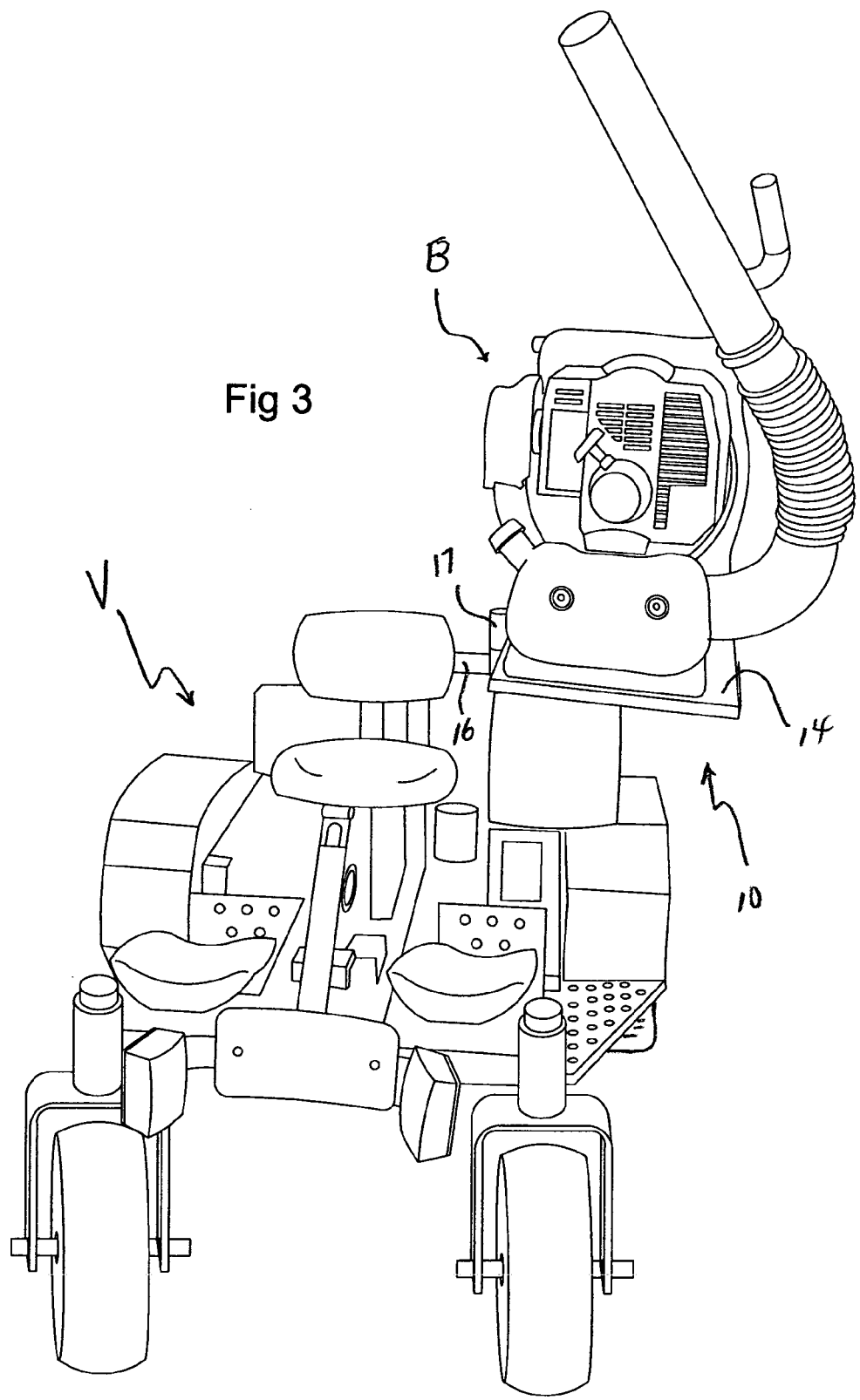
FIG. 3 is a front view of a utility vehicle having a blower support device shown in a starting position.

The present invention also includes a base support member 22. As illustrated in FIGS. 2 and 3, the vehicle to which the present implement support device 10 is to be mounted is provided with an inverted, generally L-shaped channel that serves as the base support member 22 and will support the present implement support device 10. At the distal end of the base support member 22, a cylindrical shank 25 is provided which corresponds to the receiver 17 attached to the pivotal support member 16. The tubular receiver 17 receives the shank 25 and allows the blower support assembly 12 to pivot thereabout. It should be noted that the receiver 17 and shank 25 may be reversed, i.e. the shank 25 being mounted to the pivotal support member 16 and the receiver 17 being mounted to the base support member 22.

Balance is provided by orienting the vertical portion of the base support member 22 with the vertically oriented support member 18 as seen in FIG. 2. By providing a rotational axis that is offset from the vertical support member 18, the blower support assembly 12 can be pivoted between a starting position as illustrated in FIG. 1 and a use position as illustrated in FIG. 3 through an intermediate position as seen in FIG. 2. This operation will be explained in greater detail hereinafter.

Figure 4:
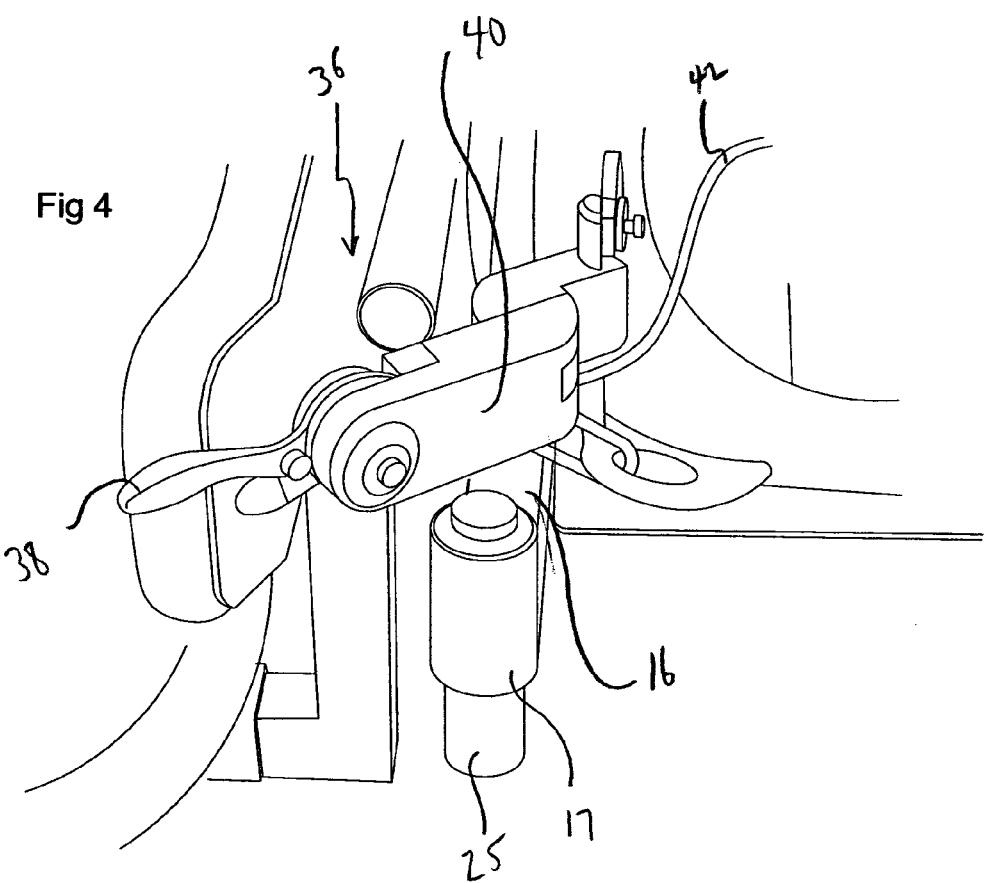
FIG. 4 is a perspective view of a remote throttle for a blower mounted on the blower support device illustrated in FIG. 1.

In order to operate the blower when it is mounted on a implement support device 10, a remote throttle control 36 is provided, as seen in FIG. 4 and is mounted for convenient use by the operator of the utility vehicle V. The remote throttle control 36 includes a lever 38 pivotably attached to a base 40. The lever 38 is in operational communication with the blower throttle using a cable assembly 42.

Figure 5:
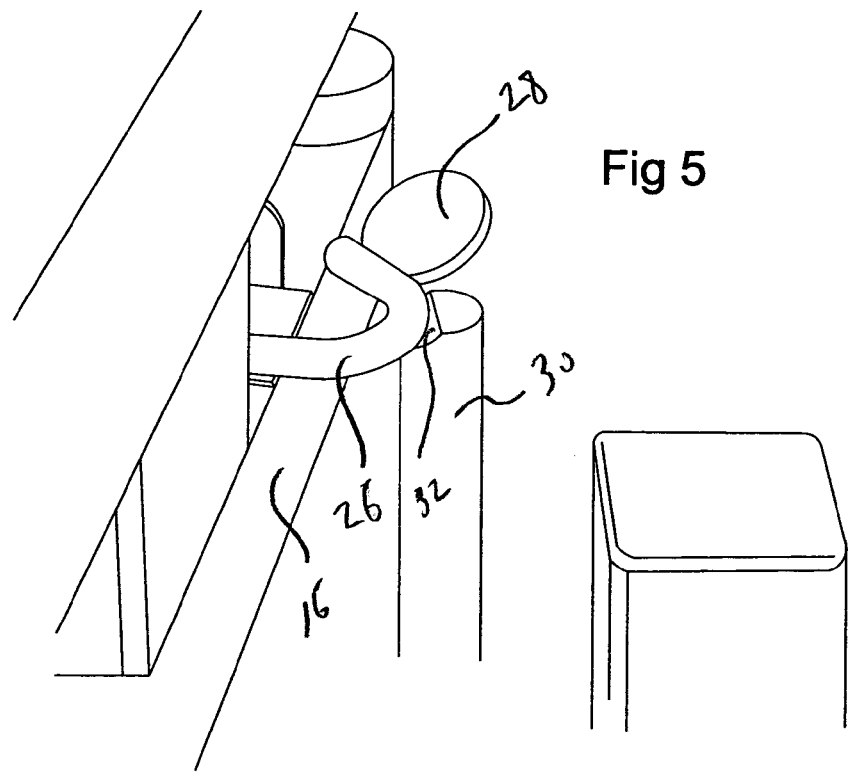
FIG. 5 is a perspective view of a latch arrangement for a blower on the blower support device illustrated in FIG. 1 shown during latching.
Figure 6:
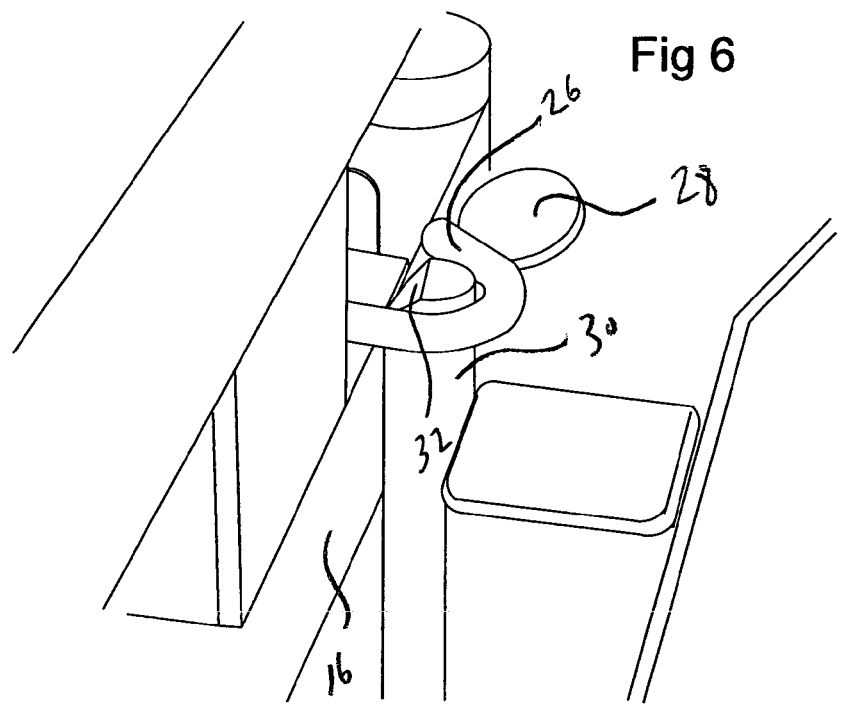
FIG. 6 is a perspective view of a latch arrangement for a blower on the blower support device illustrated in FIG. 1 shown latched.

In order to prevent the implement support assembly 12 from swinging freely on its pivot, a latching assembly 24 is provided as seen in FIGS. 5 and 6. The latching assembly 24 is mounted adjacent the vertical support member 18 and includes a curved member 26 forming a locking portion and including a generally planar lifting portion 28 for lifting engagement by a user to raise the curved member 26, and a stop bar 30 that is mounted to the vehicle V for engagement by the curved member 26. The stop bar 30 is provided with a ramped surface 32 that will assist, via contact therewith, the lifting portion 28 in passing over the stop bar 30 for locking engagement therewith.

The curved member 26 is spring-biased into a downward position and moves upwardly against the spring (not shown). Therefore, the user must lift the lifting portion 28 in order to disengage the curved member 26 from the stop bar 30. In the reverse operation, abutment of the curved member 26 with the stop bar 30 moves the curved member 26 upwardly against the spring and allows the curved member 30 to automatically lock in place once the platform 16 is moved through its travel path to the use position.

In operation, the operator places the implement support device 10 in a latched configuration as seen in FIG. 1. A blower B may be then mounted to the implement support device 10 with the straps of the blower B engaging the horizontal rods 20 as seen in FIG. 1. Once the operator has mounted the vehicle seat T, he or she can reach behind the seat and lift the curved member 26 of the latching assembly 24 as seen in FIG. 5 and move the platform 16 supporting the blower B through a 180 degree arc as seen in FIG. 2 to ultimately end up in a user access, or starting position, as seen in FIG. 3.

The blower B can then be started while the operator is seated on the seat at its position in FIG. 3 and then rotated back through the position seen in FIG. 2 into a latched configuration, as seen in FIG. 1. The user may then remove the hose and nozzle and operate the blower from the vehicle, controlling the blower with the remote throttle 36, as seen in FIG. 4.

By the above, the present invention provides an implement support device 10 for a utility vehicle that positions the user and the implement, usually a blower in a mutually compatible position to allow effective use of the blower while operating the vehicle.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

I claim:

1. A power implement support device for vehicular mounting comprising:
    an implement support assembly including an implement support member and a pivotal support member mounted thereto;
    a base support member for mounting to a vehicle adjacent an operator seat thereof, said base support member having said pivotal support member pivotably mounted thereto for movement of said implement support member between an implement use position and an implement access position; and
    a latching assembly having a first portion mounted to said implement support assembly and a second portion for mounting to the vehicle to selectively retain said implement support member in said use position.

2. A power implement support device according to claim 1 wherein said implement support assembly includes a generally planar platform for implement support.

3. A power implement support device according to claim 1 wherein said implement support assembly includes a generally vertical support member projecting outwardly from one of said implement support member and said pivotal support member.

4. A power implement support device according to claim 3 wherein said implement support assembly further includes at least one generally horizontally-oriented support member mounted to said generally vertically-oriented support member at a position vertically spaced from said implement support member.

5. A power implement support device according to claim 1 and further comprising a throttle control mechanism for a power implement, said throttle control mechanism being mounted to one of said implement support member and said pivotal support member.

6. A power implement support device according to claim 1 wherein said first portion of said latching assembly includes a curved member pivotally mounted to one of said implement support member and said pivotal support member and said second portion of said latching assembly includes a stop bar for selective engagement and disengagement by said curved member.

7. A power implement support device according to claim 6 wherein said curved member is mounted to one of said implement support member and said pivotal support member for pivotal movement of said curved member in a generally vertical manner.

8. A power implement support device according to claim 7 wherein said first portion of said latching assembly includes a lifting member mounted to said curved member to assist said pivotal movement of said curved member.

9. A power implement support device according to claim 8 wherein said stop member includes a ramped surface for engagement by said lifting member to assist said curved member to override said stop member during latching.

10. A power implement support device for vehicular mounting comprising:

an implement support assembly including an implement support platform, a pivotal support member mounted thereto, a generally vertical support member projecting outwardly from one of said implement support platform and said pivotal support member, and at least one generally horizontally-oriented support member mounted to said generally vertically-oriented support member at a position vertically spaced from said implement support platform;

a base support member for mounting to a vehicle adjacent an operator seat thereof, said base support member having said pivotal support member pivotably mounted thereto for movement of said implement support member between an implement use position and an implement access position; and a latching assembly having a first portion mounted to said implement support assembly and a second portion for mounting to the vehicle to selectively retain said implement support member in said use position, said first portion including a curved member pivotally mounted to one of said implement support member and said pivotal support member; and with said second portion including a stop bar for selective engagement and disengagement by said curved member, and wherein said curved member is mounted to one of said implement support member and said pivotal support member for pivotal movement of said curved member in a generally vertical manner.

11. A power implement support device according to claim 10 and further comprising a throttle control mechanism for a power implement, said throttle control mechanism being mounted to one of said implement support member and said pivotal support member.

12. A power implement support device according to claim 10 wherein said first portion of said latching assembly includes a lifting member mounted to said curved member to assist said pivotal movement of said curved member.

13. A power implement support device according to claim 12 wherein said stop bar includes a ramped surface for engagement by said lifting member to assist said curved member to override said stop bar during latching.

14. A leaf blower support device for mounting to a lawn vehicle, said leaf blower support device comprising:

a blower support assembly including a blower support platform, a pivotal support member mounted thereto, a generally vertical support member projecting outwardly from said one of said blower support platform and said pivotal support member, and at least one generally horizontally-oriented support member mounted to said generally vertically-oriented support member at a position vertically spaced from said blower support platform for engagement by any straps associated with the blower;

a base support member for mounting to the lawn vehicle adjacent an operator seat thereof said base support member having said pivotal support member pivotably mounted thereto for movement of said blower support member between a blower use position and a blower starting position; and a latching assembly having a first portion mounted to said blower support assembly and a second portion for mounting to the lawn vehicle to selectively retain said blower support platform in said blower use position, wherein said first portion includes a curved member pivotally mounted to one of said implement support member and said pivotal support member and wherein said second portion includes a stop bar for selective engagement and disengagement by said curved member, and wherein said curved member is mounted to one of said blower support platform and said pivotal support member for pivotal movement of said curved member in a generally vertical manner for latching engagement with and disengagement from said stop bar.

15. A leaf blower support device according to claim 14 and further comprising a throttle control mechanism for the blower, said throttle control mechanism being mounted to one of said blower support platform and said pivotal support member.

16. A leaf blower support device according to claim 14 wherein said first portion of said latching assembly includes a lifting member mounted to said curved member to assist said pivotal movement of said curved member.

17. A leaf blower support device according to claim 16 wherein said stop bar includes a ramped surface for engagement by said lifting member to assist said curved member to override said stop member during latching.

* * * * *